United States Patent [19]

Nakamura

[11] 4,306,517

[45] Dec. 22, 1981

[54] DEVICE FOR REPORTING THE END OF A MILKING PERIOD

[75] Inventor: Shigemi Nakamura, Suzaka, Japan

[73] Assignee: Orion Machinery Co., Ltd., Nagano, Japan

[21] Appl. No.: 101,649

[22] Filed: Dec. 10, 1979

[30] Foreign Application Priority Data

Apr. 7, 1978 [JP] Japan .................................. 53-91412
Apr. 7, 1978 [JP] Japan .................................. 53-91413

[51] Int. Cl.³ .............................................. A01J 7/00
[52] U.S. Cl. ................................................ 119/14.14
[58] Field of Search ............... 119/14.08, 14.14, 14.15; 128/734

[56] References Cited

U.S. PATENT DOCUMENTS

| | | | |
|---|---|---|---|
| 2,898,549 | 8/1959 | Miller | 119/14.15 X |
| 3,773,016 | 11/1973 | Needham et al. | |
| 3,871,359 | 3/1975 | Pacela | 128/734 |
| 3,878,819 | 4/1975 | Harman | 119/14.08 |
| 3,884,187 | 5/1975 | Massie et al. | 119/14.14 |
| 4,010,715 | 3/1977 | Robar et al. | 119/14.14 |
| 4,064,838 | 12/1977 | Mukarovsky et al. | 119/14.08 |

FOREIGN PATENT DOCUMENTS 650199 2/1951 United Kingdom ............. 119/14.14

Primary Examiner—Hugh R. Chamblee
Attorney, Agent, or Firm—Toren, McGeady & Stanger

[57] ABSTRACT

A device for detecting and signalling the end of a milking period includes a sensor for detecting variations of the quantity of milk flowing in a milkline connected to a test cup, and providing a corresponding output signal. Circuitry is provided for detecting the output signal of the sensor, and for actuating a signalling device such as an alarm buzzer when the flow of milk in the milk line remains below a certain level over a given period of time.

15 Claims, 5 Drawing Figures

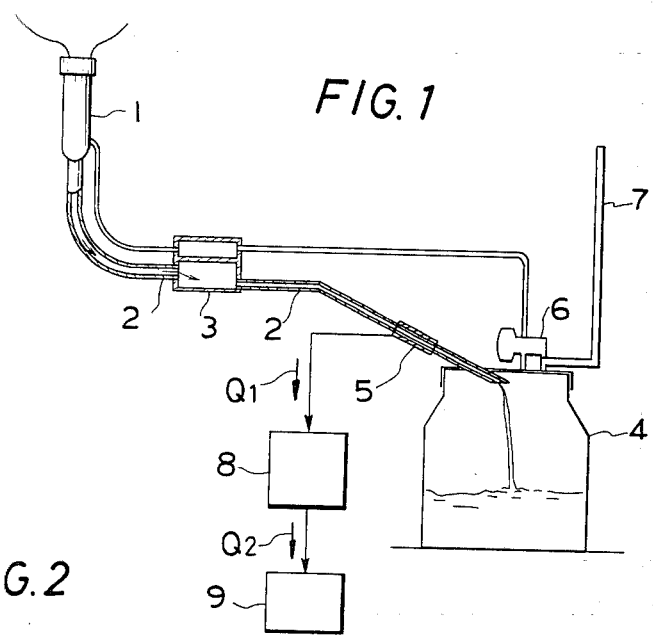
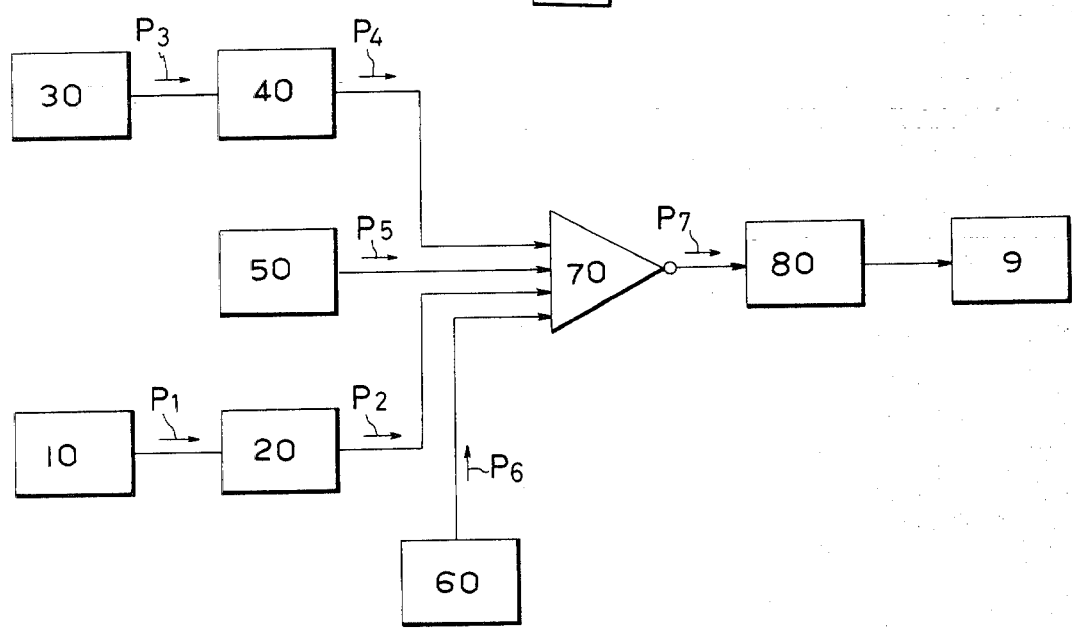
FIG.1
FIG.2

DEVICE FOR REPORTING THE END OF A MILKING PERIOD

BACKGROUND OF THE INVENTION

The present invention relates generally to milking apparatus, and more particularly to an information device for detecting and signalling the end of a milking period.

In the milking of cows, sheep, and the like, it is important that the end of the milking period be suitably detected. Up to now, when performing a milking operation with a milking machine, such detection was performed by observing the udder being milked and the condition of the milk obtained, and by the hand feel of the udder. Another prior method of determining the end of the milking period is to observe the condition of the milk as it flows in a milk line in which a translucent portion is provided.

In accordance with the prior methods, it was impossible to accurately determine the end of a milking period, notwithstanding the use of skilled techniques based on much experience. Furthermore, it has been impossible to operate a number of milking machines at the same time, because monitoring of the milking condition for each machine must be noted carefully as each milking period draws to an end. Unfortunately, when a number of milking machines are simultaneously operated in order to enhance the efficiency of the overall milking operation, some of the machines inevitably overmilk, thereby providing drawbacks in that mastitides of the udders can be induced from the overmilking, and the resistance of the udders to bacteria which induces diseases such as mastitides is greatly reduced. If operation of the milking machine is terminated prematurely in order to avoid the above undesirable conditiona, then milking efficiency is lowered because a large quantity of milk may be left in the udder. Thus, even the fully skilled milking operator must perform each milking operation with his full attention.

An object of the present invention is to provide a device for signalling the end of a milking period which overcomes the above drawbacks, namely, a device with which high performance is obtained and milking efficiency is enhanced.

More specifically, an object of the present invention is to provide an improved device for signalling the end of a milking period that can be suitably operated with present milking machines, and that can be used wih high efficiency.

In accordance with the present invention, a device for detecting and signalling the end of a milking period comprises means for sensing variation in the quantity of milk in a milk line connected to an udder by a teat cup, the sensing means providing a corresponding output signal, means for indicating the end of the milking period, and means coupled to the sensing means and indicating means for operating and controlling the indicating means in accordance with the output signal of the sensing means.

More specifically, the sensing means includes a pair of electrodes for detecting a variation of quantity of milk flowing in the milk line which conveys milk from the udder, and the controlling means includes a circuit for activating an alarm device to signal the end of the milking period, the circuit comprising a detecting circuit for generating a detecting signal in accordance with the output signal of the sensing means, a time delay circuit for delaying the detecting signal by a given time interval, an alarm control circuit for controlling the indicating means and an alternating current voltage source for supplying power to the sensing means.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is a block diagram of a device for detecting and signalling the end of a milking period in accordance with the present invention, the device being connected with a milking machine;

FIG. 2 is a block diagram of a first embodiment of the device in FIG. 1;

DETAILED DESCRIPTION OF THE INVENTION

Figure 3:
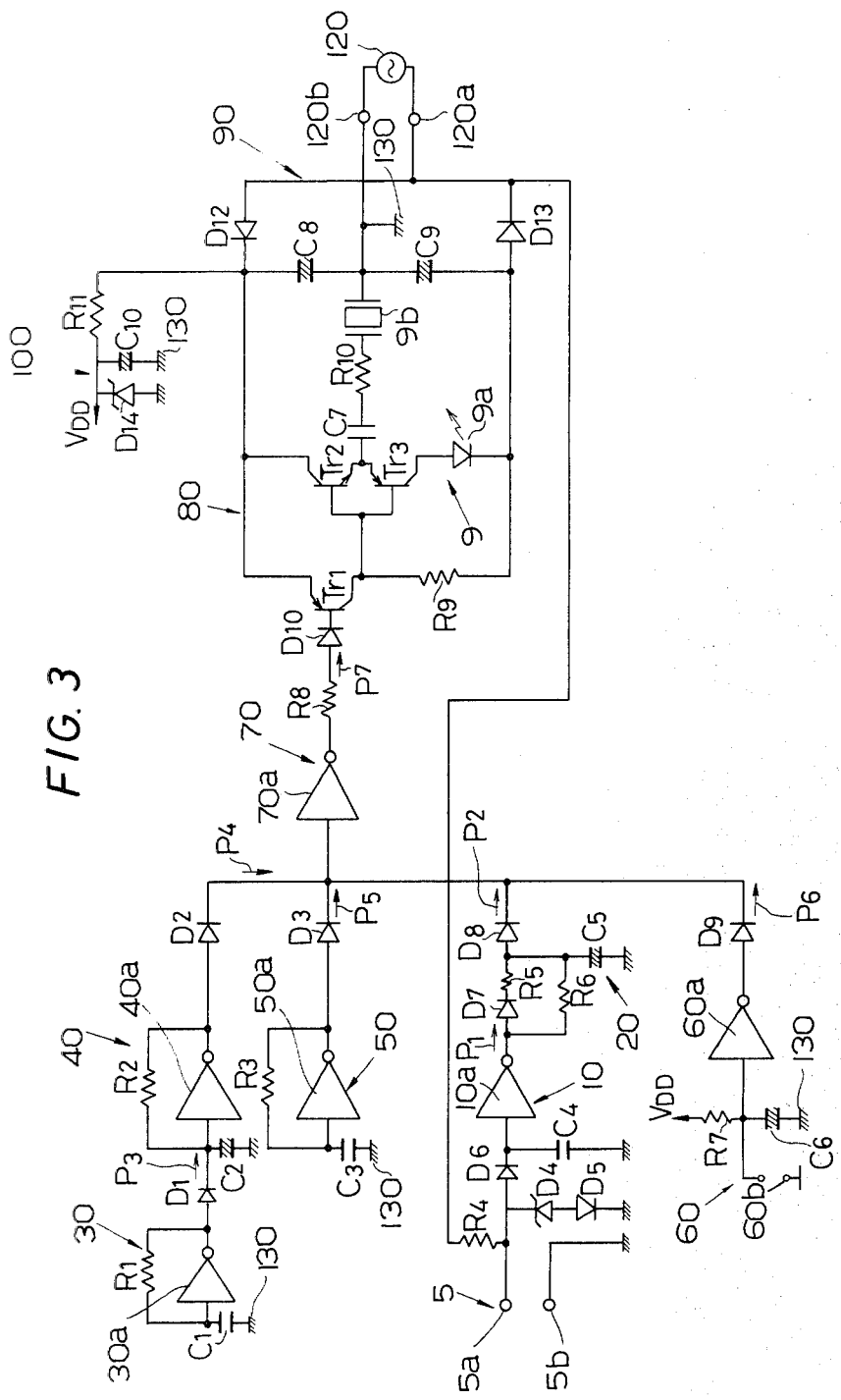
FIG. 3 is an electrical schematic diagram of the device in FIG. 2.

Referring to FIG. 1, a teat cup 1 is shown connected to a nipple of a cow, a sheep or like animal, and a tubular milk line 2 is coupled to a center portion of the teat cup 1. A claw piece 3 is provided at an intermediate location along the milk line 2. An air-tight bucket 4 is connected with the teat cup 1 in air-tight relationship through a bulser 6 which operates the teat cup 1. Milk line 2 also empties into the bucket 4. Further, the bucket 4 communicates with one end of a conduit 7, the other end of the conduit 7 being connected to a vacuum pump (not shown).

A milk flow sensor 5 includes a pair of electrodes 5a and 5b (not shown in FIG. 1) which are, respectively, mounted in opposed spaced apart relationship on the inner circumferential periphery of the milk line 2. The sensor 5 provides an electrical conducting path through the milk which flows in the milk line 2, and produces an output signal $Q_1$ in accordance with the milk flow in the milk line 2. The output signal $Q_1$ from the sensor 5 is supplied to an operating control device 8 which will be specifically described below. An output signal $Q_2$ of the control device 8 is supplied to an indicating device 9 which signals the end of a milking period.

FIG. 2 is a block diagram of a first embodiment of a detecting and signalling device in accordance with the present invention. The device comprises a detecting circuit 10 which detects the quantity of milk flowing in the milk line 2 and provides an output signal $P_1$ in accordance with the milk flow quantity, a time delay circuit 20 which delays the signal $P_1$ from the detecting circuit 10 by a preset time interval to produce a delayed signal $P_2$, a signal generator in the form of a first oscillator 30 for periodically generating a first periodic signal $P_3$, a second oscillator 40 which generates a second interrupted periodic signal $P_4$ corresponding to the signal $P_3$ from the first oscillator 30, a third oscillator 50 for generating a third periodic signal $P_5$, and a reset circuit 60 for generating a reset signal $P_6$ for resetting the delayed signal $P_2$ from the time delay circuit 20 and the periodic signal $P_4$ from the second oscillator 40.

The detecting and signalling device of the present invention further comprises a biasing circuit 70 to which the signals $P_2$, $P_4$, $P_5$ and $P_6$ are applied as input signals, a circuit 80 for driving the indicating device 9, a rectifier circuit 90 which is used as a direct current power source, and an alternating current power supply 120 which is used as a power source for the sensor 5 in order to prevent the milk from the effects of electrolysis.

A more detailed circuit diagram of the device of the present invention is illustrated in FIG. 3. One electrode 5a of the sensor 5 is connected to one terminal 120a of an alternating current voltage source 120, which can be a commercial supply line, through a resistor $R_4$, and the other electrode 5b of the sensor 5 is connected to an earth ground 130. A constant voltage element in the form of a Zener diode $D_4$ is connected between the junction of electrode 5a and resistor $R_4$, and the ground 130 through a diode $D_5$ which is arranged in a reverse bias direction with respect to the Zener diode $D_4$. By this arrangement, a comparator circuit is formed by a resistance to be provided between the electrodes 5a and 5b, the resistor $R_4$ and the Zener diode $D_4$. The electrode 5a of the sensor 5 is also connected to an input terminal of an inverter circuit 10a through a diode $D_6$. The inverter circuit 10a may be in the form of a C-MOS circuit or an inverting operational amplifier. A capacitor $C_4$ is connected between the junction of the cathode of the diode $D_6$ with the input terminal of the inverter circuit 10a, and the ground. Accordingly, the milk flow detecting circuit 10 comprises resistor $R_4$, the Zener diode $D_4$, diods $D_5$ and $D_6$, the capacitor $C_4$ and the inverter circuit 10a.

A series circuit including a diode $D_7$ and a resistor $R_5$ is connected to the output terminal of the inverter circuit 10a as shown. An integration circuit is formed by a resistor $R_6$ which is connected in parallel with a series circuit formed by diode $D_7$ and resistor $R_5$, and a capacitor $C_5$ which is connected between the resistor $R_6$ and ground. Time delay circuit 20 thus comprises the diode $D_7$, resistors $R_5$ and $R_6$, and capacitor $C_5$. An output terminal of the time delay circuit 20 is connected to an input terminal of a NAND gate 70a of the biasing circuit 70 by way of a diode $D_8$.

First oscillator 30 includes an inverter circuit 30a, a resistor $R_1$ and a capacitor $C_1$. Capacitor $C_1$ is connected between an input terminal of the inverter circuit 30a and ground, and the resistor $R_1$ is connected in parallel with the inverter circuit 30a. The second oscillator 40 is connected to the first oscillator 30 by way of a diode $D_1$ in series relationship, and includes an inverter circuit 40a having a parallel connected resistor $R_2$ and a capacitor $C_2$ which is connected between an input terminal of inverter circuit 40a and the ground 130. Second oscillator 40 is also connected to an input terminal of the NAND gate 70a through a diode $D_2$ as shown in FIG. 3. Third oscillator 50 comprises an inverter circuit 50a, a resistor $R_3$ connected in parallel with the inverter circuit 50a, and a capacitor $C_3$ which is connected between the input terminal of the inverter circuit 50a and the ground 130. The output of the third oscillator 50 is connected to the input of the NAND gate 70a by way of a diode $D_3$.

Reset circuit 60 comprises an inverter circuit 60a, a resistor $R_7$ which is connected between the input terminal of the inverter circuit 60a and a constant voltage circuit 100, a capacitor $C_6$ which is connected between the input terminal of the inverter circuit 60a and the ground 130, and a mechanical reset switch 60b which is connected in parallel with the capacitor $C_6$. Further, the output of the reset circuit 60 is connected to the input side of the NAND gate 70a of biasing circuit 70 by way of a diode $D_9$, as shown.

The biasing circuit 70 includes NAND gate 70a, a resistor $R_8$ which is connected in series with the output terminal of NAND gate 70a, and a diode $D_{10}$ whose anode is connected to the resistor $R_8$.

Driving circuit 70 includes a transistor $Tr_1$ whose base electrode is connected to the cathode electrode of diode $D_{10}$, transistors $Tr_2$ and $Tr_3$ whose base electrodes are connected to the collector electrode of transistor $Tr_1$, and a series circuit consisting of a capacitor $C_7$ connected to the emitter electrodes of transistors $Tr_2$ and $Tr_3$, and a resistor $R_{10}$. Indicating circuit 9 comprises an indicating lamp member in the form of a light emitting diode 9a which is connected to the collector electrode of the transistor $Tr_3$, and an alarm member such as a piezoelectric buzzer 9b which is connected to the resistor $R_{10}$ as shown.

Rectifier circuit 90 comprises a diode $D_{12}$ whose anode is connected to terminal 120a of the A.C. power source 120, and a diode $D_{13}$ whose cathode electrode is also connected to terminal 120a, and capacitors $C_8$ and $C_9$ which are connected to terminal 120b of the A.C power source 120. A Zener diode $D_{14}$ and a capacitor $C_{10}$ are each connected in parallel between the D.C. output side of the circuit 90 and the ground 130 to form a constant voltage circuit 100. The output of the constant voltage circuit 100 is connected to the reset circuit 60 through the resistor $R_7$.

Operation of the device for signalling the end of a milking period in accordance with the present invention will now be explained.

The resistance provided between the electrodes 5a and 5b will vary in accordance with the quantity of milk flowing in the milk line 2. The detecting circuit 10 can be actuated at a predetermined value of resistance between electrodes 5a and 5b of the sensor 5 by changing the value of the resistor $R_4$. In the detecting circuit 10, a reference voltage V is set to $\frac{1}{2}V_{DD}$ ($V_{DD}$ being the D.C. output voltage of the circuit 100) by the Zener diode $D_4$. The output voltage of the inverter 10a will be substantially zero volts when the applied voltage is higher than $\frac{1}{2}V_{DD}$ due to the instantaneous resistance between the electrodes 5a and 5b. When the voltage applied to the input of the inverter 10a is lower than $\frac{1}{2}V_{DD}$, the output voltage of inverter 10a is at substantially $V_{DD}$ volts. In other words, when the quantity of milk flowing through the sensor 5 is above a given value, the resistance between the electrodes of the sensor 5 will decrease below a preset value, and the output voltage of inverter 10a is at a high level such as $V_{DD}$ volts. When the resistance across the electrode increases, the voltage applied to the input of inverter 10a increases, and the detecting signal $T_1$ corresponding to the output voltage of the inverter circuit 10a is at a low level.

When the detecting signal $P_1$ is applied to the time delay circuit 20, the time delay circuit delays the signal $P_1$ by a preset time interval such as, for example, 5 seconds which time is determined by the integration circuit consisting of resistor $R_6$ and capacitor $C_5$. In case the quantity of milk flowing in the milk line 2 again attains the preset value within the time delay interval of the time delay circuit 20, the detecting signal $P_1$ recovering to a high level, the delayed output signal $P_2$ of time delay circuit 20 will remain at a high level. On the other hand, in the case where the voltage applied to the input of the inverter circuit 10a is maintained at a high lever for a period longer than the delay time of the circuit 20, the time delay circuit 20 provides a delayed signal $P_2$ at its output, and the signal $P_2$ is supplied to the NAND gate 70a of the biasing circuit 70 by way of the diode $D_8$.

The first oscillator circuit 30 generates a periodic output signal $P_3$ having a predetermined frequency. Second oscillator circuit 40 inverts the signal $P_3$ from the first oscillator circuit 30, and generates a periodic output signal $P_4$ to be supplied to the input of the NAND gate circuit 70a through the diode $D_2$. The third oscillator circuit 50 supplies a periodic output signal $P_5$ to the NAND gate 70a through the diode $D_3$.

The reset signal $P_6$ from the reset circuit 60 is at a low level under normal conditions (switch 60b open). When all of the output signals $P_2$, $P_4$, $P_5$ and $P_6$ are at a low level, the output signal of the biasing circuit 70 will be at a high level. Accordingly, when the output signal $P_2$ of the time delay circuit 20 attains a low level due to the continued decrease of milk flowing in the milk pipe 2 over a predetermined time interval, the output of the biasing circuit 70 will be at a high level, so that transistor $Tr_1$ of the driving circuit 80 will be biased in an ON state.

When transistor $Tr_1$ becomes conductive, the base electrodes of transistors $Tr_2$ and $Tr_3$ are forward biased thereby making transistors $Tr_2$ and $Tr_3$ conductive. When transistors $Tr_2$ and $Tr_3$ are conductive, the light emitting diode illuminates to indicate the end of the milk period and, at the same time, the buzzer 9b sounds to report the end of the milk period to the milking operators.

When a milking operator actuates the reset switch 60b of the reset circuit 60 to an ON state in response to the signalling of the end of the milking period, electric charge developed on capacitor $C_6$ is discharged through the switch 60b, and the voltage applied to the input of the inverter 60a is reduced to zero volts or a substantially low level. When the input voltage to the inverter circuit 60a is at a low level, output signal $P_6$ is at a high level so that the output signal $P_7$ of the biasing circuit 70 is at a low level. Consequently, the drive circuit 80 ceases to operate, and the signalling and alarm operation of the indicating circuit 9 ceases.

In accordance with the first embodiment of the present invention, discussed above, it is no longer necessary to determine the end of a milking period by visually observing the flow of milk in the milk line or by manually touching the udder. Accordingly, the efficiency of the milking operation is enchanced because a number of milking machines can be operated at one time and without the need for skilled techniques.

Further, in the first embodiment of the device, an indicating signal generating portion of the device comprises a first oscillator circuit 30 for generating a signal $P_3$, a second oscillator circuit 40 for interrupting the signal $P_3$ to provide an output signal $P_4$, and a third oscillator circuit 50.

Moreover, an indicating signal for the indicating circuit 9 is always generated from the oscillator circuits 30, 40 and 50 to obtain a response to the milk flow quantity signal $Q_1$ from the sensor 5. In addition, since the detecting signal $P_1$ from the detecting circuit 10 is delayed by the time delay circuit 20, malfunction of the operating portion 8 of the present device is avoided with respect to transient changes in the quantity of milk flowing in the milk line 2. The overall efficiency of the milking operation is thereby enhanced. Finally, since the A.C. power source 120 is used for supplying the power to the sensor 5, in accordance with the present invention, electrolysis is avoided and milk of good quality is obtained.

Figure 4:
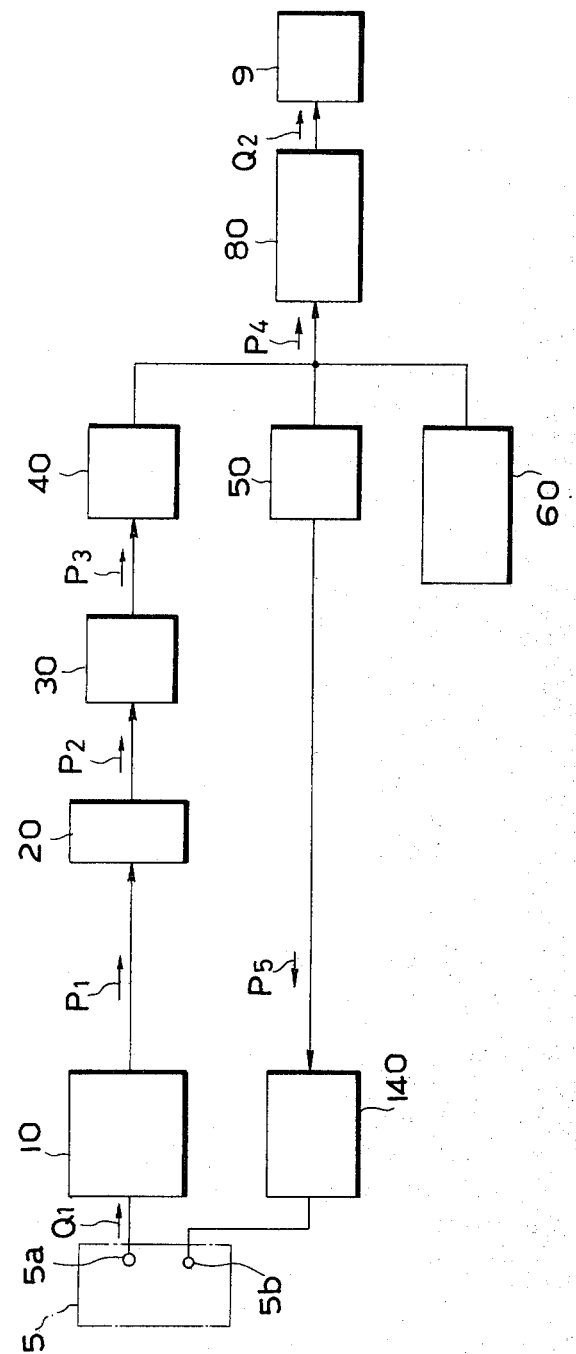
FIG. 4 is a block diagram of a second embodiment of a device according to the present invention.
Figure 5:
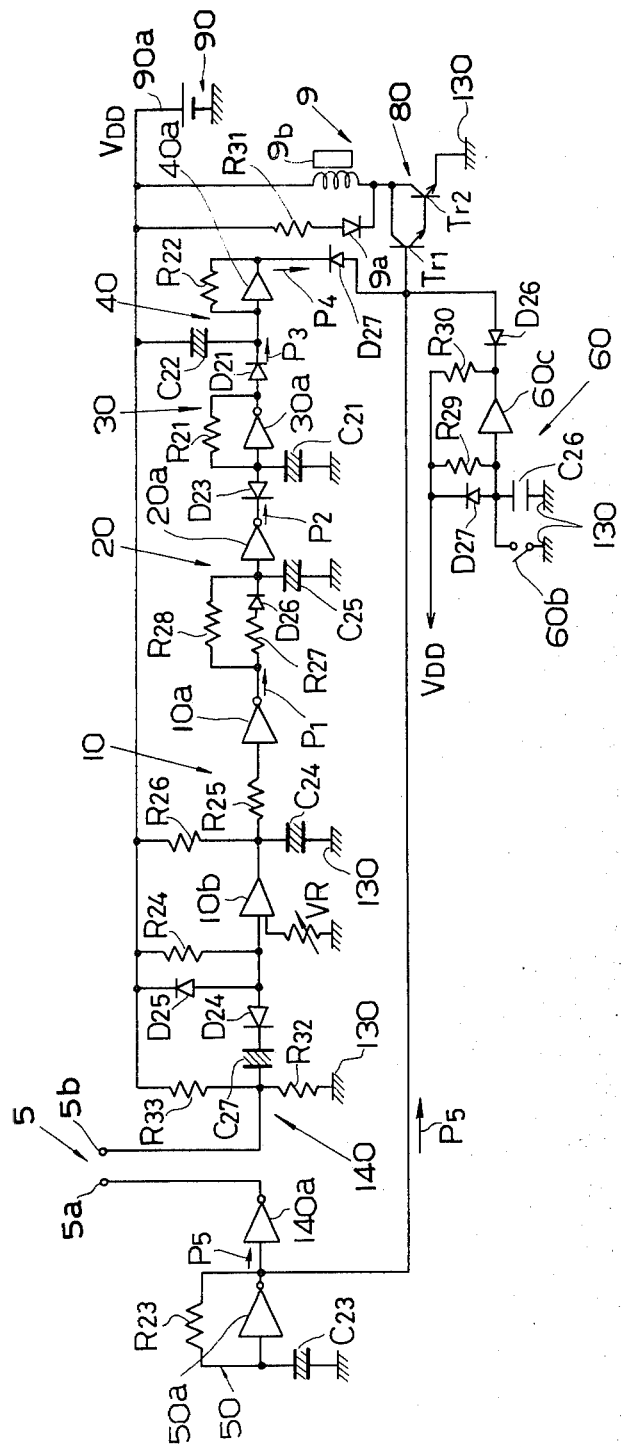
FIG. 5 is an electrical schematic diagram of the device in FIG. 4.

FIGS. 4 and 5 show a second embodiment of a device for detecting and signaling the end of a milking period according to the present invention.

As shown in FIG. 4, the second embodiment of the present device also comprises a detecting circuit 10 for detecting the milk flow quantity signal $Q_1$ from the sensor 5, a time delay circuit 20 for delaying the output signal of the detecting circuit 10 by a given time interval, a first oscillator circuit 30 connected in series to the time delay circuit 20 for interrupting the delayed output signal at a predetermined time rate, a second oscillator circuit 40 connected in series to the first oscillator circuit 30 for generating a periodic output signal $P_3$, and a third oscillator 50 for generating another periodic signal to be coupled to the indicating circuit 9. An indicating signal generating portion of the device is formed by the first oscillator 30, the second oscillator 40 and the third oscillator 50. Further, the second embodiment of the present device includes the reset circuit 60, and the driving circuit 80 for actuating the indicating circuit 9.

As is more clearly shown in FIG. 5, one electrode 5a of the sensor 5 is connected to the output terminal of an inverter 140a, and the other electrode 5b of the sensor 5 is connected to a capacitor $C_{27}$ and a resistor $R_{33}$. A resistor $R_{32}$ is connected at one end of the ground 130, the other end of resistor $R_{32}$ connecting to capacitor $C_{27}$ and to positive electrode 90a of a direct current voltage source in the form of a battery 90 through the resistor $R_{33}$. An alternating current voltage generating circuit 140 is comprised by the inverter 140a, resistors $R_{32}$ and $R_{33}$, and the capacitor $C_{27}$.

One input terminal of an operational amplifier 10b is connected to capaitor $C_{27}$ from the A.C. voltage generating circuit 140 by way of a reverse biased diode $D_{24}$, and a variable resistor VR is connected and arranged between another input terminal of the operational amplifier 140a and the ground 130. A resitor $R_{24}$ and a reverse biased diode $D_{25}$ are connected in parallel between the junction of the anode of diode $D_{24}$ and the input terminal of operational amplifier 10b, and the positive electrode 90a of the battery 90. The output terminal of the operational amplifier 10b is connected to the input terminal of an inverter 10a through a resistor $R_{25}$. Also, the junction of the output terminal of the operational amplifier 10b and resistor $R_{25}$ is connected to the positive electrode 90a through a resistor $R_{26}$, this junction being connected to the ground 130 by capacitor $C_{24}$. Accordingly, a detecting circuit 10 is formed by the inverter 10a, the operational amplifier 10b, the resistors $R_{24}$-$R_{26}$, the variable resistor VR and the diodes $D_{24}$ and $D_{25}$. Detecting circuit 10 includes a comparator circuit consisting of the operational amplifier 10b, resistor $R_{24}$, diode $D_{25}$ and the variable resistor VR.

An inverter 20a has its input terminal connected to the output terminal of inverter 10a by way of resistors $R_{27}$, $R_{28}$ and a diode $D_{26}$, as shown. A capacitor $C_{25}$ is connected between the input terminal of inverter 20a and the ground. A time delay circuit 20 is thus formed by resistors $R_{27}$, $R_{28}$, the capacitor $C_{25}$ and the inverter $20a$.

The input of a first oscillator 30 including an inverter $30a$ has its input connected to the output of the time delay circuit 20 through a series connected diode $D_{23}$, as shown. A second oscillator 40 including an inverter $40a$ has its input terminal connected to the output of the first oscillator 30 through a diode $D_{21}$. A resistor $R_{22}$ is connected in parallel across the inverter $40a$, and a capacitor $C_{22}$ is connected between the positive electrode $90a$ of battery 90 and the input of the inverter $40a$.

A third oscillator 50 includes an inverter $50a$ having its output terminal connected to the input terminal of inverter $140a$ of the A.C. voltage generator 140. Resistor $R_{23}$ is connected in parallel across the inverter $50a$, and capacitor $C_{23}$ is connected between the input terminal of inverter $50a$ and the ground 130.

A driving circuit 80 comprises cascade connected transistors $Tr_1$ and $Tr_2$, the base electrode of the transistor $Tr_1$ being connected to the output terminal of inverter $50a$ and to the input terminal of the inverter $140a$. The base electrode of transistor $Tr_1$ is also connected to the output of the second oscillator 40 through a diode $D_{27}$, as shown. A resetting circuit 60 is connected to the base electrode of the transistor $Tr_1$ through a diode $D_{26}$, the resetting circuit 60 including a switch $60b$, operational amplifier $60c$, resistors $R_{29}$ and $R_{30}$, and diode $D_{27}$ connected as shown.

The second embodiment of the device of the present invention operates as follows:

Detecting circuit 10 is actuated by the presence of a preset resistance value between the electrodes $5a$ and $5b$ in accordance with the value of the resistance set for the variable resistor VR. When the value of the resistance provided across the electrodes of the sensor 5 increases from a predetermined value due to a change in the amount of milk flowing in the milk line, an output signal $P_1$ is provided from the detecting circuit 10 which is at a high level such as that of the power source voltage. On the other hand, when the resistance value of the sensor is lower than the preset value, the signal $P_1$ is at a low level, e.g., zero volts. The output signal $P_1$ of the detecting circuit 10 is delayed by the time delay circuit 20 and, therefore, no putput signal is generated by the time delay circuit 20 in case the milk flow is interrupted for only a moment.

When the quantity of milk flow decreases below a predetermined value over a time interval longer than that determined by the values of resistor $R_{28}$ and capacitor $C_{25}$, the signal $P_1$ representing the end of the milking period is coupled to the time delay circuit 20 which then provides a delayed output signal $P_2$. The first oscillator 30 is controlled by the output signal $P_2$ of time delay circuit 20, and generates a periodic output signal $P_3$. The second oscillator 40 generates a periodic output signal $P_4$ in accordance with the signal $P_3$, and the signal $P_4$ is applied to the base electrode of the transistor $Tr_1$ of the driving circuit 80. A periodic output signal $P_5$ is supplied from the third oscillator 50 to the driving circuit 80 and to the A.C. voltage generating circuit 140.

When the quantity of milk flowing in the milk line 2 reaches a predetermined value, the resistance provided by the sensor 5 is relatively small, and the output voltage provided by the operational amplifier $10b$ is substantially at zero volts. Thus, the output signal $P_1$ is roughly $V_{DD}$ volts since the output of amplifier $10b$ is inverted by the inverter $10a$. Signal $P_1$ is further delayed by the integration circuit consisting of resistor $R_{28}$ and capacitor $C_{25}$, and thereafter is applied to the input of inverter $20a$ of time delay circuit 20. The delayed output signal $P_2$ is therefore at a low level, e.g. zero volts, and the first oscillator 30 ceases operation.

When the quantity of milk flowing in the milk line is continuously decreased over a time longer than the preset time interval, the output voltage of the comparator circuit including the operational amplifier $10b$ will be at a high level, and the signal $P_1$ will be at substantially zero volts due to the inverting operation of inverter $10a$. When the output signal $P_1$ is at zero volts, the delayed output signal $P_2$ will be at $V_{DD}$ volts because of the inverting operation of inverter $20a$. When the delayed signal $P_2$ is at a high level, the first oscillator 30 is free to operate and the output voltage of the first oscillator 30 is no longer at zero volts. The second oscillator 40 then generates the oscillating output signal $P_4$.

The base electrode of transistor $Tr_1$ is forward biased by the signals $P_4$ and $P_5$, and transistors $Tr_1$ and $Tr_2$ become conductive. When transistor $Tr_2$ turns on, current is supplied to light emitting diode $9a$ and buzzer $9b$, thereby allowing the indicating circuit 9 to signal the end of a milking period to the milking operator. The milking operator may also stop the signalling operation of the indicating circuit by closing the resetting switch $60b$ of the resetting circuit 60. When the switch $60b$ is closed, electric charge stored on the capacitor $C_{26}$ is discharged through the switch $60b$, and the output voltage of the amplifier $60c$ becomes zero. When the output of the amplifier $60c$ is at zero volts, the base electrode of transistor $Tr_1$ is lowered to a zero volt level, so that the indicating circuit 9 thereafter ceases to operate.

An advantage of the device shown in FIGS. 4 and 5 is that A.C. power is supplied to the sensor 5 from the A.C. voltage generating circuit 140, so that the battery 90 may be used as the power supply for the controlling portion 8 and the sensor 5 of the present device. Accordingly, the device can be used at any location because a power supply cable is unnecessary.

An advantage of the present invention over the prior art devices is the achievement of high performance, since the present device reliably detects the end of a milking period by means of delaying a signal corresponding to the flow of milk in a milking machine. Also, inasmuch as the end of the milking period is detected accurately, a milking operator can operate a number of milking machines so that milking efficiency is enhanced.

Another advantage of the present invention is that the quality of the milk obtained is not lowered since an A.C. voltage source is used for the sensor in the milk line.

Regarding the first embodiment of the device as shown in FIG. 3, the gate $70a$ has been referred to herein as a NAND gate. It will be understood that the gate $70a$ can be a NAND gate having all of its inputs tied together so that it can be depicted as in FIG. 3. It will also be understood that gate $70a$ itself operates as an inverter and, together with the diodes $D_2$, $D_3$, $D_8$ and $D_9$ connected to its single input as in FIG. 3, operates as a NOR gate so that a high level output signal is provided by the gate $70a$ when all of the signals applied to the anode of the diodes $D_2$, $D_3$, $D_8$ and $D_9$ are at a low level.

While specific embodiments of the invention have been shown and described in detail to illustrate the application of the inventive principled, it will be understood that the invention may be embodied otherwise without departing from such principles.

What is claimed is:

1. A device for detecting and signalling an end of a milking period in an arrangement wherein a teat cup is affixed to an udder and milk is conveyed during a given time period by a milk line connected to the teat cup, comprising means for sensing variations of the quantity of milk flowing in the milk line and providing a corresponding output signal, said sensing means including a pair of electrodes arranged to be mounted on the milk line in opposed spaced apart relationship relative to each other; means for indicating the end of the milking period; means coupled to said sensing means and said indicating means for controlling said indicating means in accordance with said output signal, said controlling means comprising a detecting circuit for generating a detecting signal in response to a variation of the quantity of the milk flowing in the milk line which is sensed by said sensing means, a time delay circuit coupled to said detecting circuit for delaying said detecting signal by a given length of time, signal generating means for providing an indicating signal to actuate said indicating means, a biasing circuit coupled to said signal generating means and said time delay circuit for providing a biasing signal in accordance with the delayed detection signal, and a driving circuit coupled to said biasing circuit for actuating said indicating means in response to said biasing signal; and means for supplying power to said sensing means, said controlling means and said indicating means.

2. A device according to claim 1, wherein said detecting circuit includes a comparator circuit comprising the resistance to be provided between said pair of electrodes, a constant voltage element and an inverter circuit.

3. A device according to claim 1, wherein said time delay circuit includes an integration circuit for delaying said detecting signal.

4. A device according to claim 1, wherein said signal generating means includes a first oscillator for generating a first periodic signal, a second oscillator coupled to said first oscillator for generating a second interrupted periodic signal in accordance with said first periodic signal, and a third oscillator for generating a third periodic signal.

5. A device according to claim 1, wherein said biasing circuit includes an inverter, and a resistor and a diode connected in series with said inverter.

6. A device according to claim 1, wherein said driving circuit comprises a switching circuit including transistors.

7. A device according to claim 1, wherein said signal generating means includes a first oscillator coupled to said time delay circuit for generating a first periodic signal during a given time interval in accordance with the output of said time delay circuit, a second oscillator coupled to said first oscillator for interrupting said first periodic signal and for generating a second periodic signal; and a third oscillator for generating a third periodic signal.

8. A device according to claim 1, wherein said pair of electrodes are arranged to provide a value of resistance which varies in accordance with the quantity of milk flowing in the milk line.

9. A device according to claim 1, comprising a reset circuit for resetting said indicating means to prevent said indicating means from being actuated.

10. A device according to claim 9, wherein said reset circuit includes a mechanical resetting switch.

11. A device according to claim 1, wherein said power supply means comprises an alternating current voltage source for supplying power to said sensing means and a direct current voltage source for supplying power to said controlling means.

12. A device according to claim 11, wherein said alternating current voltage source is a commercial alternating current supply line.

13. A device according to claim 11 wherein said direct current voltage source comprises a rectifier circuit for rectifying the alternating current voltage from said alternating current voltage source, and a constant voltage circuit for providing a direct current voltage from said rectifier circuit.

14. A device according to claim 11, wherein said direct current voltage source is a battery.

15. A device according to claim 11, wherein said alternating current voltage source includes an alternating current voltage generating circuit for providing power in accordance with said indicating signal.

* * * * *